(12) United States Patent
Varma et al.

(10) Patent No.: US 8,347,061 B2
(45) Date of Patent: Jan. 1, 2013

(54) METHOD FOR PROTECTING USER-MANAGED MEMORY USING AN EXCEPTION

(75) Inventors: Pradeep Varma, New Delhi (IN); Rudrapatna K. Shyamasundar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1282 days.

(21) Appl. No.: 12/111,480

(22) Filed: Apr. 29, 2008

(65) Prior Publication Data

US 2009/0271763 A1 Oct. 29, 2009

(51) Int. Cl.
*G06F 12/02* (2006.01)
(52) U.S. Cl. .......................... 711/173; 711/163; 714/763
(58) Field of Classification Search .................. 711/163, 711/173; 714/763
See application file for complete search history.

(56) References Cited

U.S. PATENT DOCUMENTS

| 5,088,036 | A * | 2/1992 | Ellis et al. .............................. 1/1 |
| 2004/0172652 | A1 | 9/2004 | Fisk et al. |
| 2004/0250239 | A1 | 12/2004 | Fox et al. |
| 2005/0015579 | A1 | 1/2005 | Grover et al. |
| 2006/0161516 | A1 | 7/2006 | Clarke et al. |

OTHER PUBLICATIONS

Report on the Experimental Language X10 Version 1.01. Dec. 8, 2006. http://x10.sourceforge.net/docs/x10-101.pdf.
Allen, E., Chase, D., Luchangco, V., Maessen, J.-W., Sukyoung, R., Steele Jr., G. L., Tobin-Hochstadt, S. The Fortress Language Specification Version 0.618. Apr. 26, 2005. Sun Microsystems Inc. http://research.sun.com/projects/plrg/fortress0618.pdf.
Chapel Specification 0.4. Feb. 4, 2005. Cray Inc. 411 First Ave S, Suite 600, Seattle WA98104. http://chapel.cs.washington.edu/specification.pdf.
http://java.sun.com/j2se/1.4.2/docs/api/org/omg/CORBA/OBJECT_NOT_EXIST.html.
http://www.corba.org/.
http://java.sun.com/j2se/1.4.2/docs/api/org/omg/CORBA/ORB.html.
David F. Bacon, Perry Cheng, and V.T. Rajan, A Real-time Garbage Collector with Low Overhead and Consistent Utilization. Conference Record of the Thirtieth ACM Symposium on Principles of Programming Languages (New Orleans, Louisiana, Jan. 2003), pp. 285-298.
http://www.rtsj.org/specjavadoc/book_index.html.
Austin, T. M., Breach, S. E., and Sohi, G. S. 1994. Efficient detection of all pointer and array access errors. In Proc ACM SIGPLAN 1994 Conf. Programming Language Design and Implementation (Orlando, Florida, United States, Jun. 20-24, 1994). PLDI '94. ACM, New York, NY, 290-301.
Berger, E. D. and Zorn, B. G. 2006. DieHard: probabilistic memory safety for unsafe languages. In Proc. ACM SIGPLAN 2006 Conf. Prog. Language Design and Implementation, SIGPLAN Not. 41, 6 (Jun. 2006), 158-168.
Boehm, H. 1993. Space efficient conservative garbage collection. In Proc. ACM SIGPLAN 1993 Conf. Prog. Language Design and Implementation (Albuquerque, New Mexico, United States, Jun. 21-25, 1993). R. Cartwright, Ed. PLDI '93. ACM, New York, NY, 197-206.

(Continued)

*Primary Examiner* — Kalpit Parikh
(74) *Attorney, Agent, or Firm* — Ryan, Mason & Lewis, LLP

(57) ABSTRACT

Techniques for providing safe user-managed memory are provided. The techniques include performing memory allocation in constant time, performing memory de-allocation in constant time, performing memory access overhead for safety checking in constant time, and using the memory allocation, memory de-allocation and memory access overhead to protect at least one memory access, user-specified allocation and de-allocation with at least one exception for said user-managed memory.

17 Claims, 7 Drawing Sheets

OTHER PUBLICATIONS

ISO/IEC 9899:1999 C standard, 1999. ISO/IEC 14882:1998 C++ standard, 1998. Also, ISO/IEC 9899: 1999 C Technical Corrigendum, 2001, www.iso.org.

Chilimbi, T. M., Davidson, B., and Larus, J. R. 1999. Cache-conscious structure definition. In Proc. of the ACM SIGPLAN 1999 Conference on Programming Language Design and Implementation (Atlanta, Georgia, United States, May 1-4, 1999). PLDI '99. ACM, New York, NY, 13-24.

Hauswirth, M. and Chilimbi, T. M. 2004. Low-overhead memory leak detection using adaptive statistical profiling. In Proc. ASPLOS 2004, SIGPLAN Not. 39, 11 (Nov. 2004), 156-164.

Hill, M. D., Chilimbi, T. M., and Larus, J. R. 1999. Cache-conscious structure layout. In Proceedings of the ACM SIGPLAN 1999 Conf. on Programming Language Design and Implementation (Atlanta, Georgia, United States, May 1-4, 1999). PLDI '99. ACM, New York, NY, 1-12.

Cho, D. W., Kim, S. K., and Oh, S. A new approach to detecting memory access errors in C programs. In Proc. 6th IEEE/ACIS Int. Conf. on Computer and Information Science (Melbourne, Australia, Jul. 11-13, 2007). ICIS 2007. 885-890.

Condit, J., Harren, M., McPeak, S., Necula, G. C., and Weimer, W. 2003. CCured in the real world. In Proc. ACM SIGPLAN 2003 Conf. on Programming Language Design and Implementation (San Diego, California, USA, Jun. 9-11, 2003). PLDI '03. ACM, New York, NY, 232-244.

Dhurjati, D. and Adve, V. 2006. Backwards-compatible array bounds checking for C with very low overhead. In Proc. 28th Int. Conf. Software Engineering (Shanghai, China, May 20-28, 2006). ICSE '06. ACM, New York, NY, 162-171.

Dhurjati, D. and Adve, V. 2006. Efficiently Detecting All Dangling Pointer Uses in Production Servers. In Proc. Int. Conf. Dependable Systems and Networks (Jun. 25-28, 2006). DSN. IEEE Computer Society, Washington, DC, 269-280.

Dhurjati, D., Kowshik, S., and Adve, V. 2006. SAFECode: enforcing alias analysis for weakly typed languages. In Proc. ACM SIGPLAN 2006 Conf. Prog. Language Design and Implementation, SIGPLAN Not. 41, 6 (Jun. 2006), 144-157.

T. A. El-Ghazawi, W. W. Carlson, and J. M. Draper, "UPC Language Specifications V 1.0", Feb. 25, 2001. ftp://ftp.seas.gwu.edu/pub/upc/downloads/upc_specs.pdf.

R. Hastings and B. Joyce. Purify: Fast detection of memory leaks and access errors. In Proc. Usenix Winter 1992 Technical Conference, pp. 125--138, Berkeley, CA, USA, Jan. 1991. Usenix Association.

Jim, Trevor, Morrisett, J. G., Grossman, D., Hicks, M. W., Cheney, J., and Wang, Y. 2002. Cyclone: A Safe Dialect of C. In Proceedings of the General Track: 2002 USENIX Annual Technical Conference (Jun. 10-15, 2002). C. S. Ellis, Ed. USENIX Association, Berkeley, CA, 275-288.

R. W. M. Jones and P. H. J. Kelly. Backwards-compatible bounds checking for arrays and pointers in C programs. In Automated and Algorithmic Debugging, Linkoping, Sweden, pp. 13--26, 1997.

Loginov, A., Yong, S. H., Horwitz, S., and Reps, T. W. 2001. Debugging via Run-Time Type Checking. In Proc. 4th International Conf. Fundamental Approaches to Software Engineering (Apr. 2-6, 2001). H. Hußmann, Ed. Lecture Notes in Computer Science, vol. 2029. Springer-Verlag, London, 217-23.

Necula, G. C., McPeak, S., and Weimer, W. 2002. CCured: type-safe retrofitting of legacy code. In Proc. 29th ACM SIGPLAN-SIGACT Symp. on Principles of Programming Languages (Portland, Oregon, Jan. 16-18, 2002). POPL '02. ACM, New York, NY, 128-139.

Oiwa, Y. Implementation of a Fail-Safe ANSI C Compiler. PhD Thesis, Department of Computer Science, University of Tokyo, Dec. 2004.

Qin, F., Lu, S., and Zhou, Y. 2005. SafeMem: Exploiting ECC-Memory for Detecting Memory Leaks and Memory Corruption During Production Runs. In Proc. of the 11th Int. Symp. High-Performance Computer Architecture (Feb. 12-16, 2005). HPCA. IEEE Computer Society, Washington, DC, 291-302.

Ruwase, O. and Lam, M. 2004. A practical dynamic buffer overflow detector. In Proc. Network and Distributed System Security (NDSS) Symposium. Feb. 2004, 159-169.

Spoonhower, D., Auerbach, J., Bacon, D. F., Cheng, P., and Grove, D. 2006. Eventrons: a safe programming construct for high-frequency hard real-time applications. In Proc. ACM SIGPLAN 2006 Conf. Prog. Language Design and Implementation SIGPLAN Not. 41, 6 (Jun. 2006), 283-294.

Varma, P. "Generalizing Recognition of an Individual Dialect in Program Analysis and Transformation", In Proc. ACM Symp. Applied Computing (SAC 2007) (Seoul, Korea, Mar. 11-15, '07) ACM Press, New York. 1432-1439.

Varma, P. Anand, A., Pazel, D. P., Tibbitts, B. R. "NextGen EXtreme Porting: Structured by Automation", In Proc. ACM Symp. Applied Computing (SAC 2005) (Santa Fe, NM, USA, Mar. '05) ACM Press, New York. 1511-1517.

Xu, W., DuVarney, D. C., and Sekar, R. 2004. An efficient and backwards-compatible transformation to ensure memory safety of C programs. In Proc. of the 12th ACM SIGSOFT Int. Symp. Foundations of Software Engineering (Newport Beach, CA, USA, Oct. 31-Nov. 6, 2004). SIGSOFT '04/FSE-12. ACM, New York, NY, 117-126.

* cited by examiner

FIG. 1

```
// presumed: heap_offset_bits, protected_heap_first
typedef unsigned long word;
#define H (1 << heap_offset_bits)
#define version_bits (sizeof(word) * CHAR_BIT - heap_offset_bits - 1)
#define no_of_versions (1 << version_bits)
word unused_heap_offset =0;

typedef struct L^k {word v;    // version
                    struct L^k * next;
                    char o[k];}
     L_k;

typedef struct // big endian specific
      {word heap_kind : 1;
        word v : version_bits;
        word h_offset : heap_offset_bits;
      } P;
L_k * free_list_k = NULL;
L_k * unusable_free_list_k = NULL;
word last_version_k =no_of_versions - 2;
```

FIG. 2

```
// translate version-carrying pointer
void * translate_pointer (void * ptr)
   { return protected_heap_first + ((P *) &ptr)->h_offset; } bool verify (void * ptr) {
   return ((P *) &ptr) ->v ==
        *((word *) (translate_pointer(ptr) - 2* sizeof(word)));
}
```

FIG. 3

```
                                                                    ⟋302
void * allocate_protected_k (){
  L_k * result;
  if (free_list_k != NULL) // allocate from free list
    { result =free_list_k, free_list_k = free_list_k -> next; } else if (H - unused_heap_offset >= k + 2 * sizeof(word) ) {
    result = (L_k *) (protected_heap_first + unused_heap_offset);
    unused_heap_offset = unused_heap_offset + k+2 * sizeof(word);
    result->v = (last_version_k + 2) % no_of_versions ;} else return NULL; // indicates failure to allocate

// return encoded pointer
  void * encoded_offset=
    (void *) (((void *) result - protected_heap_first) + 2 * sizeof(word));
  P * ptr = (P *) &encoded_offset;
  ptr->v = result->v; // encode version
  ptr->heap_kind = 1; // encode protected_heap kind
  return *((void **) ptr); // return encoded pointer
}
```

FIG. 4

```
                                                                    ⟋402
bool increment_version_k(L_k * object) {
  word gap = (last_version_k + (no_of_versions-
                       object->v)) % no_of_versions;
  object->v = (object->v + 1) % no_of_versions;
  return (gap != 0);
} bool deallocate_protected_k (void * ptr) {
  L_k * object = (L_k *) (translate_pointer(ptr) - 2* sizeof(word));
  if (((P *) &ptr) ->v! = object->v) return false;
  if (increment_version_k(object))
      { object->next = free_list_k; free_list_k =object;}
  else {object->next = unusable_free_list_k;
        unusable_free_list_k = object;}
  return true;
}
```

FIG. 5

```
struct L⁰ {word alignment : 1; // = 0
    word size : heap_offset_bits;
    word v : version_bits;
    struct L⁰ * next;
    word[ ⌈sizeof(T)/sizeof(word)⌉ ] o;} struct L¹ {word alignment : 1; // = 1
    word size : heap_offset_bits;
    word v : version_bits;
    struct L¹ * next;
    doubleword[ ⌈sizeof(T)/sizeof(doubleword)⌉ ] o;}
```
— 502

FIG. 6

```
struct P⁶ {
    word heap_kind : 1; word v : version_bits; word h_offset : heap_offset_bits;   // word 1
    word alignment : 1; word size : version_bits; word object_offset : heap_offset_bits;   // word 2
}
```
— 602

FIG. 7

```
void * allocate_protected_k (word * n) {
  L_k * result;
  if (free_list_k != null) {...} // allocate from free list else if (*n > 0) // re-use versions
    {last_version_k = (last_version_k + *n) % no_of_versions;
    *n = 0; // indicates that last_version_k has been advanced.
    free_list_k = unusable_free_list_k;
    unusable_free_list_k = null;
    if (free_list_k != null) { result = free_list_k;
              free_list_k = free_list_k -> next; }} else if (...) {...} // allocate from unused heap
  ...
}
```

FIG. 8

```
for (int j=0; j<N; j++) {
   b[j] = SCALAR *c[j]; // Array elements are of float type.
}
```

FIG. 9

```
for (j = 0; j <N; j++){
   assert(verify((void *) b));
   assert(verify((void *) c));
   *((float *) translate_pointer((void *) b) +j) =
      SCALAR * (*((float *) translate_pointer((void *) c) +j));
}
```

FIG. 10

```
assert(verify((void *) b));
assert(verify((void *) c));
float * _b = (float *) translate_pointer((void *) b);
float * _c = (float *) translate_pointer((void *) c);
for (j = 0; j <N; j++){
    *(_b + j) = SCALAR * (*(_c + j));
}
```
1002

FIG. 11

```
b[0] =(float *) malloc (sizeof(float));
*b[0] = SCALAR*c[0];
for (int j=1; j<N; j++) {
   free((void *) b[j-1]);
    b[j] =(float *) malloc (sizeof(float));
    *b[j] = SCALAR*c[j];
}
free((void *) b[N-1]);
```
1102

FIG. 12

```
assert(verify((void *) b_));
assert(verify((void *) c));
*((float **) translate_pointer((void *) b_)) = (float *) allocate_protected_k();
assert(verify( *((float **) translate_pointer((void *) b_)) ));
*((float *) translate_pointer((void *)
        *((float **) translate_pointer((void *) b_)))) =
    SCALAR * (*((float *) translate_pointer((void *) c)));
for (j = 1; j <N; j++) {
    assert(verify((void *) b_));
    assert(deallocate_protected_k((void *)
        *((float **) translate_pointer((void *) b_) +j - 1)));
    assert(verify((void *) c));
    *((float **) translate_pointer((void *) b_) +j) =
                    (float *) allocate_protected_k();
    assert(verify( *((float **) translate_pointer((void *) b_) +j) ));
    *((float *) translate_pointer((void *)
        *((float **) translate_pointer((void *) b_) +j))) =
    SCALAR * (*((float *) translate_pointer((void *) c) +j));
}
assert(verify((void *) b_));
assert(deallocate_protected_k((void *)
        *((float **) translate_pointer((void *) b_) +N - 1)));
```

1202

METHOD FOR PROTECTING USER-MANAGED MEMORY USING AN EXCEPTION

FIELD OF THE INVENTION

The present invention generally relates to information technology, and, more particularly, to user-managed memory.

BACKGROUND OF THE INVENTION

User-specified memory management is commonplace in software development (for example, C, C++). Providing safety support to such management so that programs throw exceptions upon user error as opposed to crashing inexplicably is a relatively recent development.

Memory safety in the context of C/C++ became a concern after the advent of the languages (for example, Purify). Existing approaches describe a memory access error as a dereference outside the bounds of the referent, either address-wise or time-wise. The former includes a spatial access error (fox example, array out of bounds access error), and the latter includes a temporal access error (for example, dereferencing a pointer after the object has been freed). However, such approaches ate limited by difficulty in tracing and fixing attributes of these errors.

Another existing approach includes sharing and looking up virtual page numbers via the hardware memory management unit (MMU). However, with such an approach, the object lookup cost is not guaranteed to be constant, and varies according to table size even if operating system (OS) and/or hardware supported. Also, such an approach only treats heap temporal access errors, and each object allocation, however small, blocks out a full virtual page size. Further, in such an approach, virtual space overuse (simultaneously live objects) can cause paging-mechanism-related thrashing which would affect not only the application process, but also other processes in the machine.

Another existing approach includes a table-based framework to handle temporal and spatial memory access errors. However, such an approach does not obtain constant-time operations. Also, such an approach does not include recycling of capabilities.

Other existing approaches include table-based techniques for checking spatial memory violations in C/C++ programs, using automatic pool allocation to partition the large table of objects, as well as statically analyzing application sources Additional existing approaches can include run-time type checking schemes that track extensive type information in a "mirror" of application memory to detect type-mismatched errors However, such a scheme concedes expensiveness performance-wise (due to mirror costs, not constant time ops— for example, type information generated is proportional to object size including aggregate objects) and does not comprehensively detect dangling pointer errors (fails past reallocations of compatible objects analogous to Purify).

Yet another existing approach includes shifting from splay trees to bitmaps for a domain of C programs. However, such an approach does not support indirect pointers, or bounds checking for structure members. Another approach includes a map at run-time for checking memory accesses. Other existing approaches use garbage collection for memory reuse ignoring user-specified memory reclamation. However, such approaches offers limited temporal access error protection (not safe for reallocations of deleted data) and fails for spatial access errors once a pointer jumps past a referent into another valid one Also, an existing approach can include a type inference system for C pointers for statically and dynamically checked memory safety. Such an approach, however, ignores explicit de-allocation, relying instead on Boehm Weiser conservative garbage collection for space reclamation, as well as disallowing pointer arithmetic on structure fields.

The need for user-specification of memory management in garbage collected languages comes when faced with real-time constraints. Memory management for real-time computing in Java takes one approach that is fully-automatic using a bounded-pause-time gc. This approach, however, eliminates the opportunity for precise user control of computation behavior and is suited to coarse bound times.

Other existing approaches can include scoped (that is, limited lifetime) and immortal memory regions wherein objects can be allocated in a specific scope and their space reclaimed when all references to the scope becomes zero. Space reclamation, however, remains automatic and reference count based and de-allocation of an object by a user cannot be mandated at will.

SUMMARY OF THE INVENTION

Principles of the present invention provide techniques for protecting user-managed memory using an exception. An exemplary method (which may be computer-implemented) for providing safe user-managed memory, according to one aspect of the invention, can include steps of performing memory allocation in constant time, performing memory de-allocation in constant time, performing memory access overhead for safety checking in constant time, and using the memory allocation, memory de-allocation and memory access overhead to protect at least one memory access, user-specified allocation and de-allocation with at least one exception for the user-managed memory.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof which is to be read in connection with the accompanying drawings.

BRIEF DESCRIPTION OF THE DRAWINGS

FIG. 1 is a diagram illustrating basic declarations, according to an embodiment of the present invention;

FIG. 2 is a diagram illustrating read and/or write related operations, according to an embodiment of the present invention;

FIG. 3 is a diagram illustrating allocation, according to an embodiment of the present invention;

FIG. 4 is a diagram illustrating de-allocation, according to an embodiment of the present invention;

FIG. 5 is a diagram illustrating aligned object layouts, according to an embodiment of the present invention;

FIG. 6 is a diagram illustrating general pointer layout, according to an embodiment of the present invention;

FIG. 7 is a diagram illustrating allocation with version recycling, according to an embodiment of the present invention;

FIG. 8 is a diagram illustrating a synthetic, sequential HPC Stream benchmark, according to an embodiment of the present invention;

FIG. 9 is a diagram illustrating stream using protected memory management, according to an embodiment of the present invention;

FIG. 10 is a diagram illustrating protected stream with operations hoisting, according to an embodiment of the present invention;

FIG. 11 is a diagram illustrating stream modified to allocate and de-allocate, according to an embodiment of the present invention;

FIG. 12 is a diagram illustrating modified stream with protected memory operations, according to an embodiment of the present invention;

DETAILED DESCRIPTION OF PREFERRED EMBODIMENTS

Figure 13:
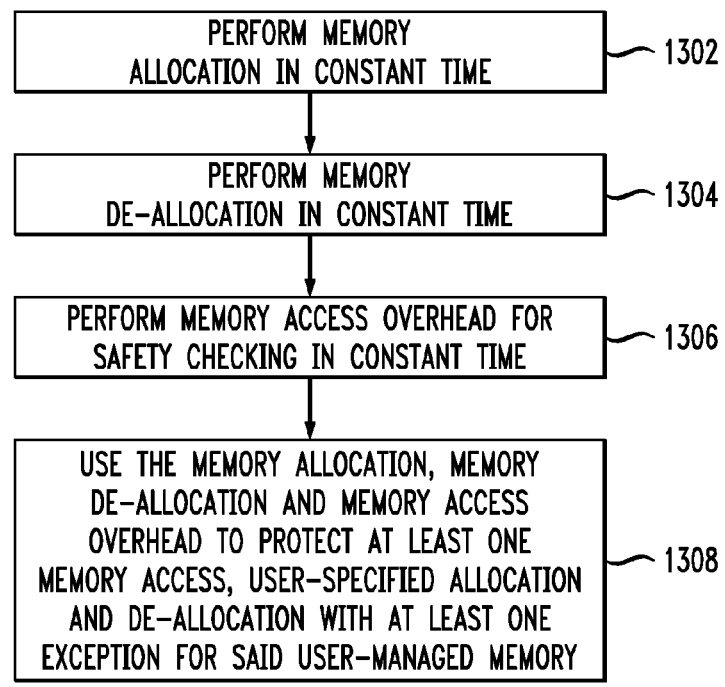
FIG. 13 is a flow diagram illustrating techniques for providing safe user-managed memory, according to an embodiment of the present invention.

Principles of the present invention include safety support for user-managed memory systems. The techniques described herein provide a table-free technique that detects temporal memory access errors (for example, dangling pointers) in programs supporting general pointers using constant-time operations for allocation, de-allocation, and memory read and/or write overhead (that is, exception checking overhead). The general pointer treatment additionally yields spatial error checks such that no nested sub-object access (for example, array element access) extends past the allocated object boundaries One or more embodiments of the invention rely on fat pointers, whose size is contained within standard scalar sizes (up to two words) so that atomic hardware support for operations upon the pointers can be obtained. Also, backward compatibility can obtained by encapsulating fat pointers use to a dedicated protected heap, separate from the remainder of unprotected storage allocation, that can be used by unchecked code (for example, library binaries). Object versions can be designed to be used with version recycling, such that one or more embodiments of the invention are extensible to conservative garbage collection so that unbounded heap recycling gets supported.

As described herein, there is no capability store or table or equivalent page table that is required to be looked up each time an object is accessed. A capability, as described herein, can be an object version that is stored with the object itself, and thus is available in cache with the object for lookup within constant time. An object is the C standard's definition, namely, a storage area whose contents may be interpreted as a value, and a version is an instantiation or lifetime of the storage area.

As such, the overheads for temporal access error checking can asymptotically be guaranteed to be within constant time. Furthermore, because each object has a version field dedicated to it, the space of capabilities can be partitioned at the granularity of individual objects and not shared across all objects as in existing approaches. Also, the techniques described herein are more efficient than those with capabilities as a virtual pages notion. This feature allows the versions described herein to be represented, for example, as a bitfield within the word that effectively contains the base address of the referent, meaning that one word is saved for capabilities in comparison to the encoded fat pointers of existing approaches without compromising on size of the capabilities space. Because versions are tied to objects, the object or storage space is dedicated to use solely by re-allocations of the same size (unless garbage collector (gc) intervenes). This fixedness of objects can be put to further use by saving the referent's size with the object itself (like version), saving another word from the pointer metadata.

The safe memory model in language described herein can be surfaced as an exception-protected heap separate from regular, unprotected storage management This can be done using a safe type qualifier similar, for example, to the manner in which Unified Parallel C (UPC) merges shared memory with private memory in C programs. The protected heap can be pre-allocated, so pointers in the heap can be represented simply as offsets from the base of the heap. This saves further space because protected heap pointer fields reduce to offset bitfields. The remaining bits can be used to store version bitfields and optional data. These savings that are made on pointer metadata are advantageous to bring encoded pointers down to standard scalar sizes of one or two words, in contrast to the 4 plus words size of existing approaches. Standard scalar sizes means that the encoded pointers detailed herein can avail of standard hardware support for atomic reads and writes, and be meaningfully cast to and from other scalars.

For example, one can end up encoding within the pointer meta-data the equivalent of the meta-data encoded by existing approaches at a much lesser space and time cost. As described herein, general pointers are treated so as to allow pointers to referents or referent members/elements (recursively). These features lead to complete coverage of the protected heap's temporal access errors. For spatial access errors, bounds violations of the allocated referent will be caught, while pointer arithmetic can go past the bounds and return and be checked.

In favor of constant time complexity and efficiency, the techniques described herein use pointer metadata directly as encoded pointers. Backward capability (for example, the ability to run with pre-compiled libraries) can be obtained by a decision to allow both protected memory operations and un-protected memory operations within the language, as detailed herein. As such, one can have staged software development and maintenance, wherein lesser tested code can be used with exception protection (that is, throwing an exception when an access error occurs for easier debugging and defect reporting), while more mature code can be transferred to unprotected execution, for example, for performance or backward compatibility. A porting tool, as appreciated by one skilled in the art, can also be used for such source transformations.

All capability-based systems have a problem in that they can run out of capability space (or version space). This is because of the fixed sized capability fields and, hence, the fixed number of capabilities they represent while a long-running program can engender an unbounded number of object lifetimes (allocation, de-allocation pairs). As noted above, existing approaches have not focused on capabilities recycling. However, one or more embodiments of the present invention include a comprehensive extension of a technique assuming a (conservative) garbage collector to derive proofs of recyclability of versions. Using a shared counter, last_version_k to keep track of freed version spaces, one can avoid linear (or worse) costs of creating large lists of freed individual capabilities. Consequently, this makes it possible to handle unbounded heap recycling.

Additionally, one or more embodiments of the invention include a cost characterization of the constants involved in the constant-time operations. This advantageously departs from existing approaches where no cost model of individual operations is provided. The constants found can be small, despite an implementation being un-optimized, showing that a sophisticated implementation of one or more embodiments of the invention would yield very general and practical results.

Un-optimized performance on a synthetic HPC Stream benchmark shows that protected read and/or write memory operations cost a few times (about five times) mote than their unprotected counterparts, with no disproportionate costs for allocation and de-allocation Consequently, even if the large opportunity for static optimization is ignored, the techniques described herein ate capable of very general application.

There are two heaps, protected and unprotected In the techniques described herein, a program can inter-mix allocations from the two heaps dynamically Allocations from the protected heap can be assertion and/or exception protected, while the other heap's allocations are not protected. The unprotected heap can be allocated, for example, as per standard technology. Objects in the unprotected heap can be pointed to, for example, as per standard technology (for example, standard C pointers). Any pointer to an object (from either heap) can have one bit reserved for indicating which heap from which the object is allocated. As a result, at most half the (virtual memory) address space is available for protected objects and half for unprotected objects. The stack can be allocated within the unprotected heap space and standard malloc can be designed to allocate unprotected objects solely from the unprotected space. Only the protected heap has to have contiguous space reserved for it.

Suppose N is the number of bits used to represent pointers to the address space (that is, standard word size, for example, 64 bits, in a 64-bit architecture). For a protected heap size of $2^M$ bytes, M is the number of bits needed for addressing bytes in the heap. Then, N−1−M bits remain unused for addressing purposes. These bits can be used, as an example, for defining version numbers of objects A version n is the $n^{th}$ time the same object or storage space has been allocated to hold a value. Storage space can be allocated just before the value is constructed and de-allocated just after the value is destroyed. Because pointers to an object may survive after the object has been de-allocated, the determination that a pointer points to the current object or an earlier version can be made using the version bits. The techniques described herein allow $2^{N-M-1}$ distinct version numbers, following which version bits can be re-cycled after proving safe recyclability. For a typical 64-bit word machine containing 64-bit pointers, suppose a protected heap of size 1 gigabyte (that is, $2^{30}$ bytes) is desired. As such, versions totaling $2^{64-1-30}=2^{33}=8$ G in number are supported (after which version recycling needs to be carried out).

As illustrated in FIGS. 1-4, one or more embodiments of the present invention can be described using C pseudo-code. In the figures, $H=2^{heap\_offset\_bits}$ is the protected heap size. The allocated layout for an object of type T is $L_{\_sizeof(T)}$, where $L_{\_k}$ is defined as given in FIG. 1. Note that the layout only involves the size of the type T and not the type itself. Thus, the various object lists (as illustrated in FIG. 1) manage objects solely by size, and allow storage sharing partitioned by size, not type. In one or more embodiments of the invention, it can be assumed that no bitfield is of size 0 (the size 0 cases are straightforward special cases).

An alternative representation for $L_{\_k}$ suitable for a statically-unknown allocation size k is as follows:

typedef void*L_k;                                              (I)

In this representation, the first two words starting from the pointers are treated as meta-data above followed by the object contents.

One or more embodiments of the invention include statically-known size layouts. Also, one or more embodiments of the invention use simple, single-wold pointers to access the objects above using the encoding for pointers, P, given in FIG. 1. The encoding can be Big-Endian platform specific, for concreteness. For this encoding, a void * pointer can be cast to a word prior to being de-structured. These simple single-word pointers are incapable of modeling intra-object pointers (to members), as described below, later.

FIG. 1 is a diagram 102 illustrating basic declarations, according to an embodiment of the present invention. "Word" is the machine word size (for example, 32 bits or 64 bits). CHAR_BIT is the number of bits in a byte (for example, ordinarily 8). The encoded pointers track addresses by the offset (P.h_offset) from the first location in the protected heap (protected_heap_first) as opposed to masking off the lower bits of direct pointers into the heap, because that allows greater generality to heap allocation in memory. Specifically, the heap does not have to start out such that protected_heap_first's lower heap_offset_bits have to be 0. Continuing with direct pointers, if one did allow heap start generality, then masking the lower addresses would have to succeed with subtraction and modulo arithmetic using the lower heap_offset_bits of protected_heap_first, which is expensive. As a result, the techniques described herein stay with heap start generality and offsets. With pointer encoding decided in the favor of offsets, the pointer in the protected heap for unused space also becomes an offset, unused_heap_offset.

For each size k, there are two global lists for managing objects including a free list (free_list_k) of previously freed objects that can be used at the next allocation, and an unusable list (unusable_free_list_k) of previously freed objects that can no longer be reused because they have run out of fresh, usable version numbers and require version recycling.

Both the free list and unusable list store objects with the version number advanced to a previously unused version. Thus, upon allocation (after recycling if needed), the version number can be used directly. Because of this structure, if a dangling pointer test is carried out when a freed object is sitting on one of these two lists, the test will succeed because the dangling pointer will be encoded with a previously used version while the freed object will have an unused one. The unusable free list is unusable, not because it cannot be allocated from, but rather because an object allocated by it cannot be subsequently freed (without a preceding recycling).

Without recycling, versions would be allocated in increasing, round-robin order from 0 until no_of_versions−1, where the last version is reserved for residence on the unusable list. With recycling, the versions wrap around (modulo no_of_versions) and start again from 0. This enshrines the principle that recycling starts from the oldest prior allocations (of versions and/or objects and/or pointers). As recycling kicks in, the upper limit of version allocations (no_of_versions−1) also wraps around and moves within the range [0 . . . no_of_versions−1]. The limit separates freed version numbers from versions that may still be in use. This limit can be tracked by last_version_k, and can be initialized to no_of_versions−2 because at the start, no recycling is involved, and no_of_versions−1 is reserved for the unusable list whose objects and object pointers are known to not be in use.

An encoded pointer can be translated to standard C pointer in FIG. 2 by obtaining the offset field within the pointer and adding that to protected_heap_first. FIG. 2 is a diagram 202 illustrating read and/or write related operations, according to an embodiment of the present invention. Pointer decoding precedes each lead and/or write operation on the object. Prior to decoding the pointer, memory safety check requires that the version stored in the object be consistent with the version stored in the pointer. This can be carried out, for example, by verify, wherein the right hand side of the equality test carries out the former and the left hand side carries out the latter.

FIG. 3 is a diagram 302 illustrating allocation, according to an embodiment of the present invention. The allocation procedure can be statically customized to size k (prefix k in allocate_protected_k). An attempt to allocate from the free list can be made. If that fails, then an attempt to allocate from the unused heap can be made. In this attempt, the version assigned is taken to be two past the (rotating) last_version_k limit. As mentioned earlier, one past the last_version_k is the number reserved for the unusable free list. If allocation does not succeed from either free list or unused heap, then an allocation failure is indicated by returning NULL.

Once an object to allocate is obtained (result), an encoded pointer to it can be created including an encoded offset, the version number obtained from the object, and the heap kind (it's a protected heap pointer). Note that the choice of heap kind bit decides the standard C pointers for the unprotected storage (in this case that these pointers come from the lower half of the machine).

As described herein, versions are tracked on a per object basis. Even though the last_version_k limit is tracked on a shared basis for the entire size k, each object (on a free list) remembers what its currently unused version number is so that if it is put in use, versions from the current version to the limit can be requisitioned.

FIG. 4 is a diagram 402 illustrating de-allocation, according to an embodiment of the present invention. De-allocation is also customized to size k. The validity of the de-allocation can be checked by testing for version consistency of the encoded pointer and the object. Invalidity causes false to be returned.

A successful de-allocation increments (via increment_version_k) the version of the object that can be used both while sitting on a free list or by the next allocation. If during incrementing it is found that the last_version_k limit is crossed, then the object can be placed on the unusable free list, else on the standard free list.

Alignment considerations can be simply built into an implementation as follows. Allocate space for an object of type T using the layout provided by struct $L^o$ or struct $L^1$ defined below using the former for T having alignment less than or equal to one word and the latter for otherwise.

FIG. 5 is a diagram 502 illustrating aligned object layouts, according to an embodiment of the present invention. Object lists can be maintained on size and alignment combinations. Allocations from an unused heap can therefore proceed from two ends of the heap, one allocating on a word boundary, the other on double word. The alignment bit can use otherwise unused space for enabling alignment verification by a direct reading of an object independently of the queues to which it belongs. It can also be modified to be used for other purposes upon need, as described herein.

The size field uses otherwise unused space in order to allow spatial safety checks to also be carried out. One of the useful features of this arrangement is that all meta data for object o wastes no padding bits or bytes, and minimally occupies two words before member o. Furthermore, there is no padding after member o if its alignment is multiples of a word. For smaller alignment objects, minimal padding that would ordinarily be added is formalized in the definition of struct $T^o$. For all such (effectively padded) identical o sizes the object lists get shared, which provides the benefit of a common pool of storage objects and versions for all these objects.

In C/C++, pointers are scalar types, and ought to be represented within one or two machine words (consistent with standard scalar sizes). Such representation would be beneficial for pointer casts, atomic operations on pointers, etc. The layout in FIG. 6 presents our general encoded pointers in two words.

FIG. 6 is a diagram 602 illustrating general pointer layout, according to an embodiment of the present invention. In FIG. 6 (that is, the layout of general pointers ($P^G$)), the first word encodes version-carrying pointer data as discussed in the algorithms presented earlier in FIGS. 1-4. The second word caches how the pointer is aligned, the cached size of the object if it fits in version_bits (0 otherwise; the size is then available from the object's size field), and the intra-object offset data since the pointer can be a pointer to an inner member of the object.

For an allocated object, its size and inner offset are known for any pointer to it or its inner member and pointer arithmetic can straightforwardly be checked for bounds correctness. This provides additional exception mechanism benefits (for example, out-of-bounds access exception for an allocated array object), beyond the ones pertaining to user-management of memory.

The pointer structure described above allows a run-time mechanism to track pointers through arithmetic, taking address of an inner element, pointer casts (that change static bookkeeping, not dynamic), etc., and still have constant-time access to bookkeeping data such as object version for temporal memory safety.

Given that C's malloc takes a dynamic size argument, the search of the corresponding object lists (or allocation and/or de-allocation functions as described herein) is a dynamic cost. While for the large majority of cases, the dynamic size would be tied to a (statically-known) type's allocation (hence sizeof( ) is known statically), a user is free to allocate space completely dynamically. For the former case of the statically known types, the search can be eliminated statically as described in FIGS. 1-4. For the unusual, fully dynamic case, the search cost can be bounded to a constant in the techniques described herein as follows. Dedicate a $P^{th}$ portion (P is a constant) of one of the two heaps of size H as a search array to contain access data for all dynamic sizes handled by the heap. The $p^{th}$ slot in the array can contain access data for sizes [p*P ... (p+1)P−1] within itself that can be searched for in time proportional to constant P. In effect, such a search array can provide a hash table with constant search size (clash per bucket). This method can be fine-tuned based on static and/or dynamic profiling and/or analysis of information of the sizes actually generated by the program.

Use of the alternative void * representation of $L_{-k}$ (see I, section 3) makes the types in the techniques k-independent. Size independence of the accessor codes (k-subscripted routines) can be obtained by passing in the size explicitly as an argument and looking up the relevant queues in the P-denominated data structures above. This general code representation can then be specialized to static accessor instances caching the lists lookup similar to the hand-coded static version presented in FIGS. 1-4.

One or more embodiments of the present invention may access the bit-fields above through mask and unmask operations on word, as that would make the bit-field sizes (and thus heap sizes) run-time constants as opposed to compile-time constants.

A version for an object can be recycled after establishing that no pointers remain in the running program with a pointer encoded with the version. Tracking individual freed versions for an individual object is expensive (it would require version lists per object). Rather, one or more embodiments of the invention track freed versions using a shared barrier and/or limit per object set of size k. For any given value of last_version_k, the techniques described herein keep the invariant that version (last_version_k+1)% no_of_versions can be occupied by residents of the unusable list alone. Versions from (last_version_k+2)% no_of_versions to last_version_k, with in-between versions wrapping around round robin (modulo arithmetic) make the entirety characterize the residents of the other list or allocated objects.

Proofs of freed versions are required to be established for pointers of all size k objects. The requirement seeks combined freedom of the earliest allocated pointers for the objects. As such, freedom of (last_version_k+2)% no_of_versions encoded pointers first. This is also likely assuming older objects are recycled first. Suppose, for example, it is established that this version and n−1 succeeding ones (wrapping around in modulo fashion) have no pointers left in the running program. The last_version_k can be advanced to (last_version_k+n) % no_of_versions, with the unusable list shifted to the free list in toto. Consequently, the barrier and/or limit moves around the set of versions in a round robin manner itself.

Such a technique requires changes to FIG. 3 allocation code alone, as given in FIG. 7, which highlights only the differences to FIG. 3. FIG. 7 is a diagram 702 illustrating allocation with version recycling, according to an embodiment of the present invention. Allocate takes a pointer to the number of versions that can be freed as an argument. If the call fails to allocate an object from the free list, it advances the last_version_k by n and shifts the unusable list to the free list and tries to allocate from that before seeking allocations from the unused heap. Once n has been used to advance last_version_k, this information can be communicated back to the calling context by resetting of the pass-by-pointer and/or reference value. FIG. 7 illustrates allocation from the unused heap only as a last resort, maximizing reuse of existing allocations for the size k from both free lists. Also, note that a failed call to allocate can be succeeded by another call to allocate with an intervening call to the garbage collector (gc) in-between.

The proof system for version recycling can include conservative garbage collection. A version can be recycled if no encoded k-size pointers remain in the program with the version. Such a proof of recyclability can be established by a gc A gc can be used to collect pointers in the running program and to see the spread of the versions per pointed object. Because encoded pointers described herein have an intricate structure (for example, heap_kind bit is set, h_offset has to point to a protected object whose next field points to another protected object, etc), they help improve the accuracy of conservative garbage collection by providing screening tests for valid pointers.

Once the amenable-to-conservative-gc system described herein has obtained the spread of pointer versions for all pointed objects of size k, it is straightforward to determine whether last_version_k can be advanced by some number of versions. One or more embodiments of the invention can follow to shepherd an unhelpful spread of versions by shifting straggler versions' pointers and objects to new versions just past the desirable last_version_k that the spread can be shifted past. This is the same as initializing the straggler entities with (last_version_k+2)% no_of_versions. The context of conservative gc may make it difficult to identify what pointers to shift to new values. However, to facilitate such a task, one can find a version that is free among the versions spread of the stragglers. Set this version to be (last_version_k+1)% no_of_versions so that this unpopulated version satisfies the version invariant of the unusable list. Such a technique moves the stragglers without any pointer rewriting to positions closer to the newer limit. To such a technique mote applicable, one can select gaps may be left in the version space during allocation for later shepherding.

Once a gc has been incorporated, it can be used for further purposes (for example, proving a memory leak by keeping a list of allocated objects and identifying objects on the allocated list to which there are no pointers). Upon user choice, warnings can be generated for dangling pointers found in the program before they have caused a system to throw any object access exception. Objects on a free list with no dangling pointers can also be shifted to the unused heap. For this, one or more of the structure of objects described is convenient. Shifted objects can be strung up in a spatially-ordered list using the next field. Because the size of an object is stored in the object, it defines the object boundary so the spatially-ordered objects can be merged and de-fragmented.

One or more embodiments of the present invention surfaces both unprotected memory management and protected memory management in a program for backward compatibility. This doubles the number of object and pointer types in a program, which is taken care of by introducing a protected qualifier ("safe") for C types and allowing array declarators to also be safe qualified. A "safe" pointer translates to an encoded fat pointer, and an unqualified pointer is a direct, un-encoded pointer. An object of a safe qualified type is allocated in the protected heap, and an unqualified object is allocated in the unprotected heap or the stack. Note that a safe qualified object can also be stack allocated if its lifetime and safe access can be proven. Otherwise, an object desired to be safe needs to be moved to the (protected) heap.

The techniques described herein go further than qualifying objects and pointers by static types alone. The pointers and objects ate dynamically tagged (the former by an explicit bit, and the latter by the heap they ate laid out in or by reserving the alignment bit for this purpose (for stack allocations)) so that the run-time values can be queried. Bits can also be extracted from the next field by changing it to offsets for such purposes. The tags survive type casts, which are maintained statically as per C's semantics. This dynamic tagging provides additional support to backwards compatibility.

In one or more embodiments of the invention, the user is allowed to write C programs in the spirit of the language (user's capable and in control), using the full range of the language (backwards compatibility), while providing additional support for safety to the extent the user needs it.

Code development and maintenance in a context such as is described herein can proceed as follows. The parts requiring extensive testing can be developed and/or ported to rely on the protected heap. Software release can be staged. Initially, less exercised code can be released with the protected heap in use so that exceptions thrown due to memory failures are easily under stood and reported to the defect tracking mechanism for repair. Once code matures (past testing), and performance and/or backwards compatibility so requires it, the code can be shifted to the unprotected mechanism.

As far as the asymptotic performance of algorithms described herein is concerned, note that none of the routines in FIGS. 1-4 have any loops or recursion. Any search cost for object lists and/or accessors for any object size k is constant as described using P-denominated structures above. As such, the cost for providing memory safety in one or more embodiments of the invention (without garbage collection) includes only constant time operations. An estimate of these constant costs shows that they are nominal, as described below.

A sequential version of the HPC Stream benchmark, as illustrated in FIG. 8, provides a comparison of the unprotected memory read and/or write operations vis-à-vis the protected memory read and/or write operations. FIG. 8 is a diagram 802 illustrating a synthetic, sequential HPC Stream benchmark, according to an embodiment of the present invention. The benchmark includes a loop over a large array, reading an element per iteration and storing its multiple in the corresponding element of another array. This benchmark may be rewritten to use protected operations by changing the (preceding) declarations of the b and c arrays to the following (using a safe array qualifier).

float c [safe N], b [safe N];

Following this, a source-to-source transformation can change FIG. 8 code to use the protected memory operations (FIGS. 1-4) as illustrated in FIG. 9. FIG. 9 is a diagram 902 illustrating stream using protected memory management, according to an embodiment of the present invention.

Note that the same benchmark with a static optimization of hoisting protection overhead out of the loop can bring the (amortized) overhead of protection down to nearly zero as illustrated in FIG. 10. FIG. 10 is a diagram 1002 illustrating protected stream with operations hoisting, according to an embodiment of the present invention.

This includes the baseline of the timed code segments (code figures described herein are directly timed segments (with no surrounding loop or repetition in cache)). Compared to the time taken per loop iteration in FIG. 10, the time taken per loop iteration in FIG. 9 is 4.85 times more, illustrating that protected operations cost about 5 times as much as their unprotected counterparts (the multiplication overhead is negligible). The timing can be done, for example, using gcc-compiled code over Cygwin on an IBM TP43p ThinkPad (Windows XP version 2.07, Intel Pentium 2.13 GHz, 32-bit platform, 1 GB RAM, float array sizes=64 Megabytes each, versions bits=2). The protected operations library code (as illustrated in FIGS. 1-4) was not optimized either by using aggressive optimization flag settings in gcc, or by in-lining the library calls (for example, use of macros) or by reusing them (for example, as given in description of FIG. 2, verify and translate_pointer are used in pairs with an extra internal call to translate_pointer for clarity and not for (straightforward) reuse). Optimizations at the level of hoisted library calls, as discussed above, can lead to a large benefit, which can include, for example, a separate category of static optimizations.

In order to take into account the cost of allocation and de-allocation, the benchmark above can be modified, as illustrated in FIG. 11. FIG. 11 is a diagram 1102 illustrating stream modified to allocate and de-allocate, according to an embodiment of the present invention.

The translated version of the modified benchmark is depicted in FIG. 12. FIG. 12 is a diagram 1202 illustrating modified stream with protected memory operations, according to an embodiment of the present invention. The benchmark adds an allocation and de-allocation, and an extra indirected read to the single read and write carried out in the iteration of FIG. 8. The cost increases about 2.66 times more for the effort. As such, the cost of allocation and de-allocation falls in the same ballpark as the read and/or write costs. Contrast this with the allocation and/or de-allocation costs of existing approaches, wherein an (optimized) program overhead of 10% jumps to 1000%, a hundred-fold increase as reported (assuming number of operations in the two benchmarks are commensurate). Also, note that the performance of standard unprotected malloc and free in existing approaches is less effective than that of one or mote embodiments of the present invention. The per-iteration cost of the code in FIG. 11 (array size 0.5 MB) averaged 3.93 times the per-iteration cost of the protected code (FIG. 12). Consequently, the techniques described herein provide the benefit of not being compartmentalized to allocation and/or de-allocation free codes and are very general.

To obtain the modified stream code, the array declaration can be changed (from unprotected code) as follows:

float c [safe N]

safe float*safe b[safe N];

The source-to-source transformed code then would be as illustrated in FIG. 12.

As described herein, principles of the present invention include table-free, constant-time, efficient techniques for detecting temporal access errors (for example, dangling pointers) in programs supporting general pointers. The techniques described is herein can also handle spatial access error checks that no nested sub-object access (for example, array element access) extends past the allocated object boundaries. One or more embodiments of the invention rely on fat pointers, whose size is contained within standard scalar sizes (up to two words) so that atomic hardware support for operations upon the pointers is commonplace. Backward compatibility can be obtained by encapsulating fat pointers use to a dedicated protected heap, separate from the remainder of unprotected storage allocation, that can be used by unchecked code (for example, library binaries). The two heaps can be surfaced at the language-level as a dialect supporting type qualifiers for safety. Also, object versions can be designed to be used with version recycling, making one or mote embodiments of the invention extensible to conservative garbage collection in order to support unbounded heap recycling.

FIG. 13 is a flow diagram illustrating techniques for providing safe user-managed memory, according to an embodiment of the present invention. Step 1302 includes performing memory allocation (for example, asymptotically without searching through or maintaining a capabilities or referent table) in constant time. Step 1304 includes performing memory de-allocation (for example, asymptotically without searching through or maintaining a capabilities or referent table) in constant time. Step 1306 includes performing memory access overhead for safety checking (for example, asymptotically without searching through or maintaining a capabilities or referent table) in constant time (for example, for exception checking). Step 1308 includes using the memory allocation, memory de-allocation and memory access overhead to protect at least one memory access, user-specified allocation and de-allocation with at least one exception for the user-managed memory.

Also, one or more embodiments of the present invention include an exception protection system for user-specified memory management, wherein the system includes a mechanism for memory allocation, a mechanism for memory de-allocation, a mechanism for memory access overhead, and a mechanism for using the memory allocation, memory de-allocation and memory access overhead to protect one ox more memory accesses and user-specified allocation and de-allocation with at least one exception for the user-specified memory. The exception protection system can be, for example, object-version based. One or more object versions used in the exception protection system are, for example, designed for recycling using a conservative garbage collector so that unbounded protected heap recycling during a program run can take place. Additionally, the exception protection system can include ability for real-time operation.

Such a system can also include a synchronization cost in the context of at least one multi-core machine, including a constant number of synchronization steps for memory allocation and de-allocation, and no synchronization overhead for memory read and memory write access. This limited synchronization cost is obtained as follows. For dynamic size allocations, the array of object queues and data for the concerned size k can be updated by the first allocation request using a shared lock over the array (or an arithmetically-determined partition of the array). The array data structure only glows monotonically because data once added to the array is not removed. So, non-allocation requests can look up the array using standard methods without any explicit synchronization costs. This reduces the synchronization cost of the exception protected memory system from a dynamic, unknown size case to a statically known size case of FIGS. 1-4 with only a single lock acquire and release cost added to allocation requests. For the static size case, allocation and de-allocation requests can be partitioned to use distinct locks by size k. Because unused heap is shared by all such requests, it can be protected by a separate lock. Using a constant number of lock operations for synchronized allocation and de-allocation using these locks is straightforward. Note that memory accesses do not incur these synchronization costs because they only do a read of the object's version field only once (for example, FIG. 2) in order to verify liveness of the object. Even if verify (for example, FIG. 2) is invoked twice, before and after memory access, each of the verify invocations ate synchronization free and can serve to establish liveness of the object during access.

The exception mechanism described herein can be interoperable with unprotected user-specified memory management (for example, as in C), with support for distinct heap spaces for protected and unprotected memories with allocation, unprotected access override to protect objects for gaining speed at the expense of dynamic exception checking, and allocation of objects from an un-protected heap for faster allocation and later unprotected access (or for immortal objects (that is, those that are known to never be de-allocated). Unprotected access override may be done when it is known that the object access is safe (for example, it falls in a period of no object de-allocation). The choice of heap size for protected and un-protected memory can be carried out using profiling data from program runs.

Additionally, such an exception mechanism can be interoperable with automatic memory management (for example, as in Java), with support for distinct heap spaces for protected and automatically-managed memories. The system described herein can also include real-time application of the exception mechanism, with protection maximized subject to resource availability within real-time constraints.

One or more embodiments of the invention can also include virtualizing a protected heap so that pointer bits not used for indexing into the heap can be used for encoding object versions that reflect a number of times object space has been re-used by the memory allocator and memory de-allocator. In effect, the memory can be scaled virtually to half or full size of the entire virtual memory size of the machine (regardless of the actual, possibly small size of the protected heap), up to which no additional methods (such as garbage collection) are needed for object space recycling.

Once virtualized protected heap memory becomes incapable of serving an object allocation request, then either the unprotected heap can be used for memory allocation, or the protected heap garbage collected can be used for recycling version numbers or storage objects. Virtualization by version numbers allows deferral of garbage collection until all version numbers have run out. Garbage collection can also be carried out concurrently, proactively, to recycle version numbers before all run out. The garbage collector need not be system provided, as it may be user-programmed in application-specific ways, with possible access to memory-management data (for example, version numbers of currently allocated objects), for decision-making.

One or more embodiments of the present invention can also include pointers to an exception-protected heap, wherein the pointers can be encoded to carry object version bits and offset bits into a protected heap. An encoded pointer, for example, occupies a space of standard scalar size (for example, one machine word or two machine words) to obtain atomic hardware support over encoded pointers and meaningful casts between pointers and other scalar types. Also, such an embodiment can further include pointers to an unprotected heap from user code, wherein the pointers can be at least one standard language pointer (for example, C scalar types), possibly with additional padding space, with access to an unprotected heap via language pointers being as fast as in standard language implementations.

As described herein, one or more embodiments of the invention can include a garbage collector with safe user de-allocation override and deferred garbage collection due to memory virtualization through at least one version number. A user can, for example, provide the garbage collector programmatically. The user-controlled garbage collector can work cooperatively (interoperably) with standard unprotected and/or automatic heap management.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 14:
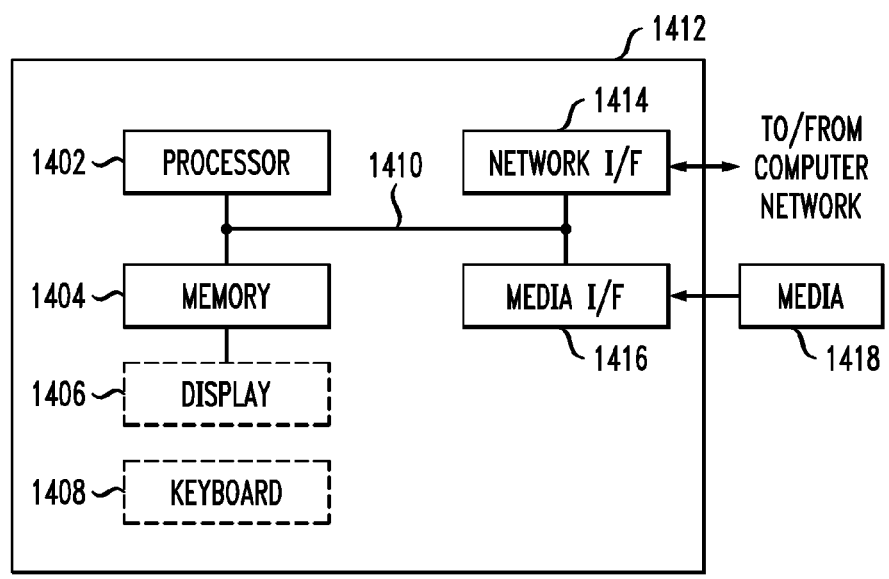
FIG. 14 is a system diagram of an exemplary computer system on which at least one embodiment of the present invention can be implemented.

At present, it is believed that the preferred implementation will make substantial use of software running on a general-purpose computer or workstation. With reference to FIG. 14, such an implementation might employ, for example, a processor 1402, a memory 1404, and an input and/or output interface formed, for example, by a display 1406 and a keyboard 1408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 1402, memory 1404, and input and/or output interface such as display 1406 and keyboard 1408 can be interconnected, for example, via bus 1410 as part of a data processing unit 1412. Suitable interconnections, for example via bus 1410, can also be provided to a network interface 1414, such as a network card, which can be provided to interface with a computer network, and to a media interface 1416, such as a diskette or CD-ROM drive, which can be provided to interface with media 1418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1418) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 1404), magnetic tape, a removable computer diskette (for example, media 1418), a random access memory (RAM), a read-only memory (ROM), a rigid magnetic disk and an optical disk. Current examples of optical disks include compact disk-lead only memory (CD-ROM), compact disk-read and/or write (CD-R/W) and DVD.

A data processing system suitable for storing and/or executing program code will include at least one processor 1402 coupled directly or indirectly to memory elements 1404 through a system bus 1410. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 1408, displays 1406, pointing devices, and the like) can be coupled to the system either directly (such as via bus 1410) or through intervening I/O controllers (omitted for clarity).

Network adapters such as network interface 1414 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, efficiency (for example, complexity overhead in allocation, de-allocation and access includes O(1) or constant costs), and applicability to multi-core and parallel and sequential computations.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for providing safe user-managed memory, comprising the steps of:
   performing memory allocation in constant time;
   performing memory de-allocation in constant time;
   performing memory access overhead for safety checking in constant time;
   using the memory allocation, memory de-allocation and memory access overhead to protect at least one memory access, user-specified allocation and de-allocation with at least one exception for said user-managed memory; and
   using at least one pointer to an exception-protected heap, wherein the at least one pointer is encoded to carry at least one object version bit and at least one offset bit into a protected heap.

2. An exception protection system for user-specified memory management, wherein the system comprises:
   a memory; and
   at least one processor coupled to said memory;
   a mechanism for memory allocation executing on the processor;
   a mechanism for memory de-allocation executing on the processor;
   a mechanism for memory access overhead executing on the processor;
   a mechanism for using the memory allocation, memory de-allocation and memory access overhead executing on the processor to protect one or more memory accesses and user-specified allocation and de-allocation with at least one exception for said user-specified memory; and
   at least one pointer to an exception-protected heap, wherein the at least one pointer is encoded to carry at least one object version bit and at least one offset bit into a protected heap.

3. The system of claim 2, wherein the exception protection system is object-version based.

4. The system of claim 3, wherein one or more object versions used in the exception protection system are designed for recycling using a conservative garbage collector so that unbounded protected heap recycling during a program run can take place.

5. The system of claim 2, wherein the exception protection system comprises an ability for real-time operation.

6. The system of claim 2, further comprising a synchronization cost in a context of at least one multi-core machine, comprising:
   a constant number of at least one synchronization step for memory allocation and de-allocation; and
   no synchronization overhead for memory read and memory write access.

7. The system of claim 2, wherein the exception mechanism is interoperable with unprotected user-specified memory management, with support for:
   at least one distinct heap space for protected and unprotected memories;
   unprotected access override to protect at least one object for gaining speed at expense of dynamic exception checking; and
   allocation of at least one object from an un-protected heap for faster allocation and later unprotected access.

8. The system of claim 7, further comprising obtaining backwards compatibility of the system via unprotected user-specified memory management.

9. The system of claim 7, wherein a choice of heap size for protected and un-protected memory is carried out using profiling data from at least one program run.

10. The system of claim 2, wherein the exception mechanism is interoperable with automatic memory management, with support for at least one distinct heap space for protected and automatically-managed memories.

11. The system of claim 2, further comprising real-time application of the exception mechanism, with protection maximized subject to resource availability within at least one real-time constraint.

12. The system of claim 2, further comprising virtualizing a protected heap so that at least one pointer bit not used for indexing into the heap can be used for encoding at least one object version that reflect a number of times object space has been re-used by at least one of the memory allocator and memory de-allocator.

13. The system of claim 2, wherein the encoded pointer occupies a space of standard scalar size to obtain atomic hardware support over one or more encoded pointers and one or more casts between pointers and other scalar types.

14. The system of claim 2, further comprising at least one pointer to an unprotected heap from user code, wherein the at least one pointer is at least one standard language pointer, with access to an unprotected heap via at least one language pointer being as fast as in at least one standard language implementation.

15. The system of claim 2, further comprising a garbage collector with safe user de-allocation override and deferred garbage collection due to memory virtualization through at least one version number.

16. The system of claim 15, wherein a user provides the garbage collector programmatically.

17. A computer program product comprising a non-transitory computer readable recordable storage medium having computer readable program code for providing safe user-managed memory, said computer program product including:
    computer readable program code for performing memory allocation in constant time;
    computer readable program code for performing memory de-allocation in constant time;
    computer readable program code for performing memory access overhead for safety checking in constant time;
    computer readable program code for using the memory allocation, memory de-allocation and memory access overhead to protect at least one memory access, user-specified allocation and de-allocation with at least one exception for said user-managed memory; and
    computer readable program code for using at least one pointer to an exception-protected heap, wherein the at least one pointer is encoded to carry at least one object version bit and at least one offset bit into a protected heap.

* * * * *